(12) United States Patent
Kurihara et al.

(10) Patent No.: US 12,267,453 B2
(45) Date of Patent: Apr. 1, 2025

(54) EVALUATION APPARATUS, EVALUATION METHOD, AND PROGRAM

(71) Applicant: NIPPON TELEGRAPH AND TELEPHONE CORPORATION, Tokyo (JP)

(72) Inventors: Sachiko Kurihara, Tokyo (JP); Noboru Harada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 565 days.

(21) Appl. No.: 17/613,908

(22) PCT Filed: Aug. 16, 2019

(86) PCT No.: PCT/JP2019/032178
§ 371 (c)(1),
(2) Date: Nov. 23, 2021

(87) PCT Pub. No.: WO2020/240880
PCT Pub. Date: Dec. 3, 2020

(65) Prior Publication Data
US 2022/0263933 A1 Aug. 18, 2022

(30) Foreign Application Priority Data

Aug. 16, 2019 (WO) .................. PCT/JP2019/021487

(51) Int. Cl.
*H04M 1/24* (2006.01)
*H04M 1/60* (2006.01)
*H04M 9/08* (2006.01)

(52) U.S. Cl.
CPC ........... *H04M 1/24* (2013.01); *H04M 1/6075* (2013.01); *H04M 9/082* (2013.01)

(58) Field of Classification Search
CPC ...... H04M 1/24; H04M 1/6075; H04M 9/082; H04M 9/02
See application file for complete search history.

(56) References Cited

U.S. PATENT DOCUMENTS 10,798,247 B2 * 10/2020 Miyamoto ............... H04B 3/20
11,503,401 B2 * 11/2022 Winton ............ G10K 11/17823
(Continued)

FOREIGN PATENT DOCUMENTS

JP 2016046695 A 4/2016
JP 2017135484 A 8/2017
(Continued)

OTHER PUBLICATIONS

ITU-T (1996) "ITU-T Recommendation p. 800: Methods for Subjective Determination of Transmission Quality", ITU.
(Continued)

*Primary Examiner* — Lisa Hashem

(57) ABSTRACT

The number of conversational tests required for evaluation of acoustic quality of the ICC system is reduced. An evaluation value converting device 3 evaluates the quality of a conversation made across a near-end acoustic area 100 and a far-end acoustic area 200 inside a vehicle in which a plurality of acoustic areas are predetermined. A voice signal collected by a microphone M2 disposed in the far-end acoustic area 200 is emitted from a speaker S1 disposed in the near-end acoustic area 100. An objective evaluation value acquisition unit 33 acquires an evaluation value using, as an evaluation target sound, a voice signal obtained by adding a voice signal obtained from a first voice signal emitted from a sound source in the far-end acoustic area 200, collected by the microphone M2, and emitted from the speaker S1 to a voice signal obtained from the first voice signal transmitted through a space inside the vehicle and
(Continued)

reaching the near-end acoustic area 100, with the first voice signal being used as a reference sound.

15 Claims, 11 Drawing Sheets

(56) References Cited

U.S. PATENT DOCUMENTS

| | | | | |
|---|---|---|---|---|
| 11,699,458 | B2* | 7/2023 | Kurihara | G01S 15/885 |
| | | | | 700/94 |
| 11,838,741 | B2* | 12/2023 | Sun | H04S 7/302 |
| 11,902,767 | B2* | 2/2024 | Willis | H04R 3/005 |
| 11,924,368 | B2* | 3/2024 | Kurihara | H04M 1/24 |
| 11,932,256 | B2* | 3/2024 | Rangarajan | B60K 35/65 |
| 11,950,067 | B2* | 4/2024 | Herbig | H04R 3/02 |
| 11,961,536 | B2* | 4/2024 | Penniman | G10L 25/78 |
| 11,968,517 | B2* | 4/2024 | Oswald | H04R 1/403 |
| 12,010,491 | B2* | 6/2024 | Laury | H04R 3/04 |
| 2009/0154713 | A1* | 6/2009 | Kamiya | H04S 7/302 |
| | | | | 381/1 |
| 2018/0159974 | A1 | 6/2018 | Dux et al. | |
| 2023/0076338 | A1* | 3/2023 | Kurihara | G10L 25/60 |
| 2023/0186878 | A1* | 6/2023 | Wipperfürth | G06F 3/165 |
| | | | | 715/772 |
| 2024/0101008 | A1* | 3/2024 | Ludwig | H04R 1/023 |
| 2024/0208385 | A1* | 6/2024 | Lade | B60N 2/879 |

FOREIGN PATENT DOCUMENTS

| | | |
|---|---|---|
| JP | 2018064162 A | 4/2018 |
| JP | 2019068237 A | 4/2019 |

OTHER PUBLICATIONS

ITU-T (2001) "ITU-T Recommendation p. 862: Perceptual Evaluation of Speech Quality (PESQ): An Objective Method for End-to-end Speech Quality Assessment of Narrow-band Telephone Networks and Speech Codecs", ITU.

NTT Corporation press release (2018) "Development of Sound Collection Techniques Facilitating Voice Operations and Communication in Automobiles", [online], [retrieved on Apr. 8, 2019], Internet <URL: http://www.ntt.co.jp/news2018/1802/180 219c. html > with English translation generated by computer.

Kitawaki et al. (2005) "Methodologies for the Performance Evaluation of Noise Reduction Algorithms and the Performance Estimation of Noisy Speech Recognition using PESQ" International Telecommunication Union, Telecommunication Standardization Sector, Study Period 2005-2008, Geneva, Jan. 18-27, 2005.

* cited by examiner

| EXPERIMENTAL CONDITION | ESTIMATED EVALUATION VALUE | EVALUATION VALUE INDEX | EVALUATION VALUE AVERAGE (RELATED ART) | EVALUATION VALUE AVERAGE (EMBODIMENT) |
|---|---|---|---|---|
| I | 4~5 | CONDITION IN WHICH NEITHER 1 NOR 2 ARE ASSIGNED | 4.1 | 4.4 |
| II | 1~2 | CONDITION IN WHICH NEITHER 4 NOR 5 ARE ASSIGNED | <u>3.3</u> | 1.4 |
| III | 3~4 | CONDITION IN WHICH 1 IS NOT ASSIGNED | 4.0 | 3.2 |
| IV | 2~3 | CONDITION IN WHICH 5 IS NOT ASSIGNED | <u>3.5</u> | 2.1 |

Fig. 6

EVALUATION APPARATUS, EVALUATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/032178, filed on 16 Aug. 2019, which application claims priority to and the benefit of International Application No. PCT/JP2019/021487, filed on 30 May 2019, the disclosures of which are hereby incorporated herein by reference in their entireties.

TECHNICAL FIELD

The present invention relates to a technique for evaluating the acoustic quality of a conversation in a vehicle.

BACKGROUND ART

With the development of communication technologies, there are increasing occasions in which loudspeaker hands-free communication systems are used, such as hands-free calls with conferencing systems, smartphones, and the like due to the convenience of the systems that enables users to have calls without holding a device. Acoustic echo cancellers (AECs) have been used to remove acoustic echoes and ambient noise that cause problems in such loudspeaker hands-free communication systems and provide a comfortable call environment.

Acoustic echoes are a phenomenon that occurs when a voice that has been transmitted from a near end is output from a speaker at a far end and then collected by a microphone at the far end. If the effects of an acoustic echo canceller are weak, acoustic echoes remain uncancelled, and if the effects are strong, even a voice transmitted from the far end is removed, which distorts or removes the voice, making it difficult to hear the voice. Because performance of an acoustic echo canceller depends on how precisely acoustic echoes are removed, evaluation of performance of acoustic echo cancellers in the related art is mainly subject to objective evaluation focusing on the amount of acoustic echoes removed. Although the objective evaluation is easy because the evaluation can be performed through computer processing, there is a problem in that the objective evaluation fails to match the quality experienced by users (also referred to as "quality of experience") in actual phone calls.

In order to evaluate acoustic echoes or sound processed by the acoustic echo canceller in subjective evaluation, it is necessary to perceive the acoustic echoes, and the evaluation is possible for the first time only when an evaluator makes a phone call by himself or herself. Thus, quality evaluation by a bidirectional conversational test has been recommended for loudspeaker hands-free communication systems for hands-free calls, and the like (see Non Patent Literature 1). Meanwhile, there are problems in that conducting the conversational test requires know-how and takes effort and costs, and has low reproducibility. Thus, a technique to perform subjective evaluation in which the conversational test is simplified and a listening test is performed for unidirectional calls has also been proposed. In addition, an objective evaluation method such as perceptual evaluation of speech quality (PESQ) for estimating a subjective evaluation value in a listening test with an acoustic signal in which a conversation voice has been recorded has also been established (see Non Patent Literature 2).

As one application of the loudspeaker hands-free communication system, in-car communication (ICC) system that supports conversations between passengers in a vehicle has begun to be used (see Non Patent Literature 3). However, no standards for properly evaluating the quality of ICC system have yet been established.

CITATION LIST

Non Patent Literature

Non Patent Literature 1: ITU-T, "ITU-T Recommendation P. 800: Methods for Subjective Determination of Transmission Quality", ITU, 1996

Non Patent Literature 2: ITU-T, "ITU-T Recommendation P. 862: Perceptual Evaluation of Speech Quality (PESQ): An Objective Method for End-to-end Speech Quality Assessment of Narrow-band Telephone Networks and Speech Codecs", ITU, 2001

Non Patent Literature 3: NTT Corporation press release, "Development of Sound Collection Techniques Facilitating Voice Operations and Communication in Automobiles", [online], [retrieved on Apr. 8, 2019], Internet <URL: http://www.ntt.co.jp/news2018/1802/180 219c.html>

SUMMARY OF THE INVENTION

Technical Problem

ICC system is a technique that supports conversations in a vehicle, and thus the quality of the conversations needs to be evaluated through conversational tests. However, various usage conditions are assumed for ICC system, such as driving, a difference in speed when driving, stopping, and the like. In addition, the test should be performed for all combinations of seats inside a vehicle. For example, if the technique is used in a vehicle 90 in which seats are arranged in three rows as illustrated in FIG. 1, a conversational test for a combination of a driver's seat 91 and a back seat 97 is performed on the assumption of a case in which a voice signal emitted from the driver's seat 91 is collected by a microphone 1F installed in the first row, a sound emission signal emitted from a speaker 2R installed in the third row is received at the back seat 97, a voice signal emitted from the back seat 97 is collected by a microphone 1R installed in the third row, and a sound emission signal emitted from a speaker 2F installed in the first row is received at the driver's seat 91. This conversational test needs to be performed for all combinations of seats at which conversations using ICC system are assumed to be performed. The reason for this is that signals that should be removed from the collected acoustic signals (i.e., signals that should be subjected to echo canceling) vary for each combination of the seats at which conversations are conducted. Thus, in the evaluation of acoustic quality of the ICC system, the number of required conversational tests becomes enormous.

An object of the present invention is to provide a technique that can reduce the number of conversational tests required for the evaluation of acoustic quality of the ICC system in consideration of technical challenges like those described above.

Means for Solving the Problem

To solve the above-described problems, an evaluation apparatus according to an aspect of this invention is an evaluation apparatus configured to evaluate quality of a conversation made across a first acoustic area and a second acoustic area in a vehicle in which a plurality of acoustic areas are predetermined, wherein at least one speaker and one microphone are disposed in each of the plurality of acoustic areas, a voice signal collected by a first microphone disposed in the first acoustic area is emitted from a second speaker disposed in the second acoustic area, and the evaluation apparatus includes an evaluation value acquisition unit configured to acquire an evaluation value using, as an evaluation target sound, a voice signal obtained by adding a voice signal obtained from a first voice signal emitted from a sound source in the first acoustic area, collected by the first microphone, and emitted from the second speaker to a voice signal obtained from the first voice signal transmitted through a space inside the vehicle and reaching the second acoustic area, the first voice signal being used as a reference sound.

Effects of the Invention

According to the invention, the evaluation of acoustic quality of the ICC system can be performed with a small number of conversational tests or without performing a conversational test.

BRIEF DESCRIPTION OF DRAWINGS

FIG. 6 is a diagram for explaining experimental results.

DESCRIPTION OF EMBODIMENTS

Figure 1:
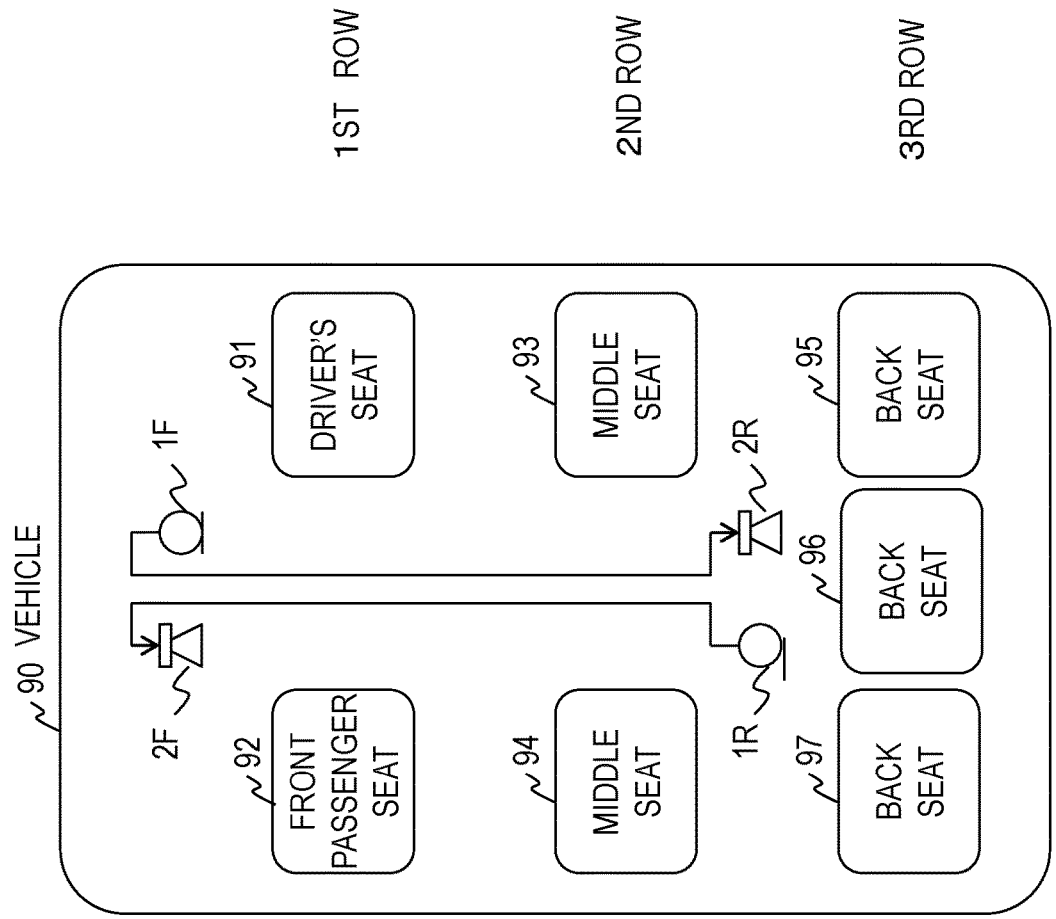
FIG. 1 is a diagram for describing an example of an ICC system use environment.

Hereinafter, embodiments of the present invention will be described in detail. Further, the same reference numerals are given to constituent units having the same functions in the diagrams and repeated description will be omitted.
Acoustic Quality Evaluation Test in Loudspeaker Hands-Free Communication System First, a concept of an acoustic quality evaluation test in a loudspeaker hands-free communication system will be described. In the acoustic quality evaluation test, a near-end talker and a far-end talker make a conversation through a loudspeaker hands-free communication system, and an evaluator located on the near-end talker side performs quality evaluation of the loudspeaker hands-free communication system. Further, the loudspeaker hands-free communication system refers to a communication system in which acoustic signals are transmitted and received between terminal devices equipped with a microphone and a speaker and refers to a communication system in which at least part of a sound output from a speaker of a terminal device is received by the microphone of the terminal device (a system in which sound wraparound occurs). Examples of the loudspeaker hands-free communication system include a voice conference system, a video conference system, and in-car communication.

In the loudspeaker hands-free communication system, a voice of the near-end talker is received by a microphone on the near-end talker side, an acoustic signal obtained based on the received voice is transmitted to the far-end talker side via a network, and sound represented by the acoustic signal is output from the speaker on the far-end talker side. In addition, sound of the far-end talker side is received by a microphone on the far-end talker side, an acoustic signal obtained based on the received sound is transmitted to the near-end talker side via the network, and sound represented by the acoustic signal is output from a speaker on the near-end talker side. However, at least part of the sound output from the speaker on the far-end talker side is also received by the microphone on the far-end talker side. That is, the sound of the far-end talker side received by the microphone on the far-end talker side is sound in which a wraparound voice (acoustic echo) of the near-end talker is superimposed on the voice of the far-end talker. That is, the sound of the far-end talker side received by the microphone on the far-end talker side is based on a signal in which a signal based on the voice of the near-end talker is degraded in the space on the far-end talker side and superimposed on a signal based on the voice of the far-end talker. Further, when the near-end talker does not speak, the signal based on the voice of the near-end talker is not superimposed, and thus the voice of the far-end talker is not degraded. In addition, the sound of the far-end talker side may be degraded due to superimposition of ambient noise of the far-end talker side.

The acoustic signal transmitted to the near-end talker side may be derived from a processing signal obtained by performing predetermined signal processing on the signal representing the sound received by the microphone on the far-end talker side, or may be obtained without performing such signal processing. The signal processing may be any processing. An example of the signal processing includes processing including at least one of echo cancellation processing or noise cancellation processing. Further, the echo cancellation processing refers to processing by an echo canceller in a broad sense to reduce echoes. The processing by an echo canceller in a broad sense means overall processing to reduce echoes. The processing by an echo canceller in a broad sense may be implemented, for example, only by an echo canceller in a narrow sense using an adaptive filter, may be implemented by a voice switch, may be implemented by echo reduction, may be implemented by a combination of at least some of the above techniques, or may be implemented by a combination of at least some of the above techniques and other techniques (see Reference 1 below). In addition, the noise cancellation processing refers to processing of curbing or removing noise components generated around a microphone of a far-end terminal and resulting from any environmental noise other than a voice of the far-end talker. The environmental noise refers to, for example, the sound of air conditioning in an office, the sound of the inside of a traveling car, the sound of cars passing through an intersection, the sound of insects, the sound of keyboard typing, and voices of multiple people (babbling sound), and the like, regardless of whether the sound is loud or faint, or is from an indoor or an outdoor place (see Reference 2 below).

[Reference 1] Knowledge Base "Forest of Knowledge", Group 2-Volume 6-Chapter 5, "Acoustic Echo Canceller", The Institute of Electronics, Information, and Communication Engineers, [online], [retrieved on Mar. 5, 2019], Internet: <URL: http://www.ieice-hbkb.org/files/02/02gun#06hen#05.pdf>

[Reference 2] Sumitaka Sakauchi, Yoichi Haneda, Masashi Tanaka, Junko Sasaki, and Akitoshi Kataoka, "An Acoustic Echo Canceller with Noise and Echo Reduction", The Journal of the Institute of Electronics, Information and Communication Engineers, Vol. J87-A, No. 4, pp. 448-457, April, 2004

Subjective Evaluation Value: Conversational Test

Subjective evaluation by a conversational test is performed as follows. The evaluator listens to an acoustic signal output from a speaker on a near-end talker side and selects the most suitable evaluation category based on the subjectivity of the near-end talker from among evaluation categories classified into a predetermined number of levels. For example, ITU-T Recommendation P.800 cited in Non Patent Literature 1 proposes a method of classifying the evaluation categories into five levels of "excellent", "good", "fair", "poor", and "bad", and assigning evaluation values of 5, 4, 3, 2, and 1 to the evaluation categories in order. The subjective evaluation is performed a plurality of times by a plurality of evaluators while changing call partners, and the collected evaluation values are aggregated to evaluate the acoustic quality.

Subjective Evaluation Value: Listening Test

Subjective evaluation by a listening test is performed as follows. An evaluator uses a binaural acoustic reproduction device such as headphones or earphones to perform subjective evaluation (opinion evaluation) for call quality by alternately listening to and comparing an acoustic signal representing sound (that is, reference sound) output from the speaker on the near-end talker side assuming that no wraparound sound is generated on the far-end talker side and an acoustic signal representing sound (that is, evaluation target sound) output from the speaker on the near-end talker side when wraparound sound is generated on the far-end talker side. A plurality of evaluators perform the subjective evaluation a plurality of times for a plurality of sets of the acoustic signals representing the reference sound and the acoustic signals representing the evaluation target sound, and aggregate the collected evaluation values to evaluate the acoustic quality.

Objective Evaluation Value: PESQ

In the objective evaluation by PESQ, a set of the acoustic signal representing the reference sound and the acoustic signal representing the evaluation target sound, which are acquired as described above, is used as an input, and a PESQ value is calculated using the calculation method disclosed in Non Patent Literature 2, for example. The "original signal X(t)" disclosed in Non Patent Literature 2 corresponds to the acoustic signal representing the reference sound, and the "degraded signal Y(t)" corresponds to the acoustic signal representing the evaluation target sound.

In-Car Communication: ICC System

ICC system is one application of a loudspeaker hands-free communication system as a technique which supports conversations among passengers sitting in each seat in a vehicle with a microphone and a speaker. A terminal including at least one microphone and one speaker is disposed near each seat, and a conversation is performed by each terminal transmitting and receiving voice signals through a voice communication network built in the vehicle. That is, a voice signal collected by a microphone disposed near a first seat is emitted from a speaker disposed in the vicinity of a second seat, a voice signal collected by a microphone disposed near the second seat is emitted from a speaker disposed near the first seat, and thereby the passenger on the first seat and the passenger on the second seat perform a conversation. Further, a space in which at least one microphone and one speaker may be disposed and there may be at least one sound source (for example, a passenger of a vehicle) is referred to as an "acoustic area". That is, in the ICC system, a plurality of acoustic areas are set in advance in a target vehicle, and at least one seat is disposed in each acoustic area.

Acoustic Quality Evaluation System

Figure 2:
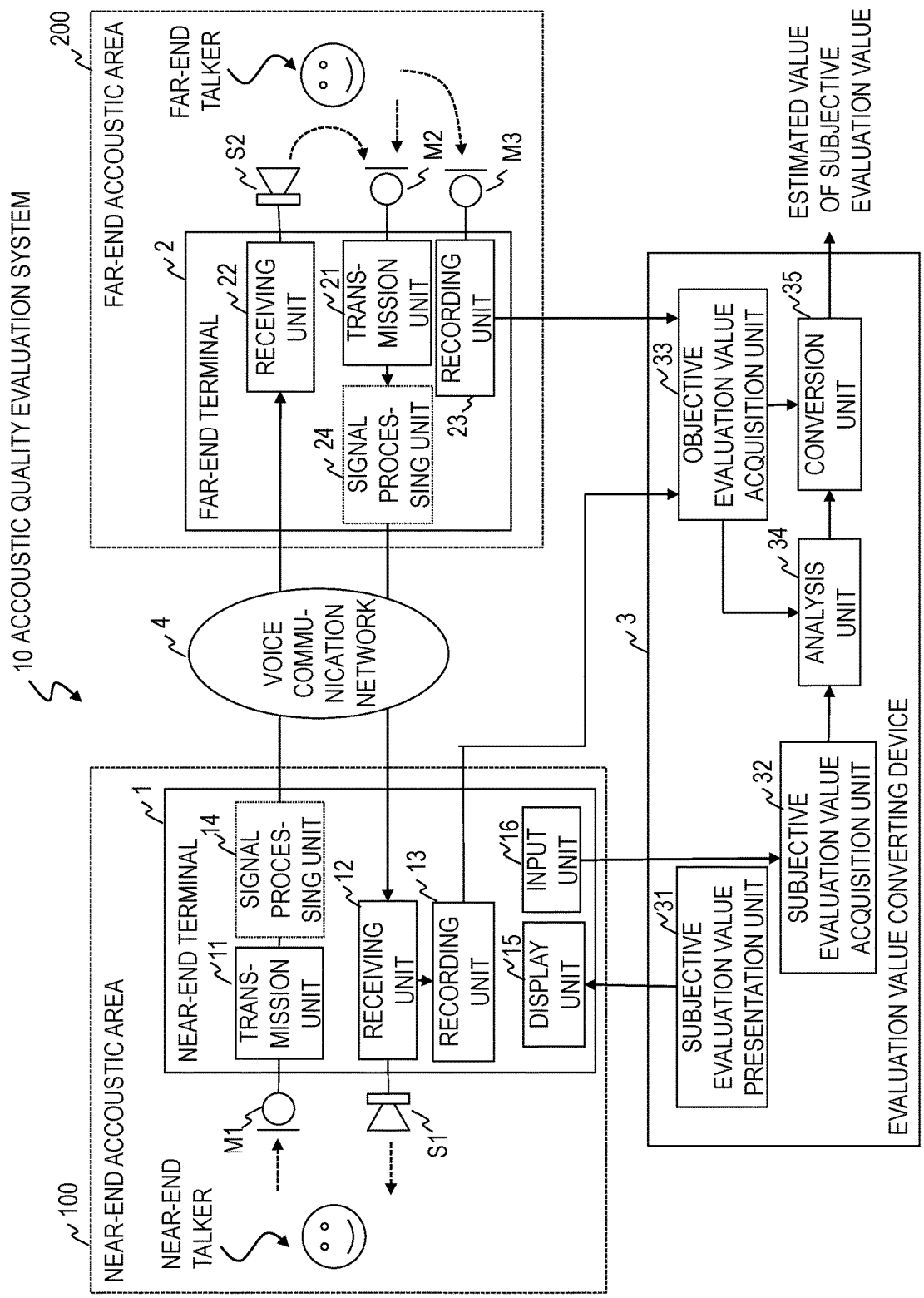
FIG. 2 is a diagram illustrating a functional configuration of an acoustic quality evaluation system.

An acoustic quality evaluation system according to an embodiment is an information communication system for converting an objective evaluation value by PESQ into a subjective evaluation value by a conversational test. The acoustic quality evaluation system 10 according to the embodiment includes a near-end terminal 1 used by a near-end talker, a far-end terminal 2 used by a far-end talker, and an evaluation value converting device 3 as illustrated in FIG. 2. In the acoustic quality evaluation system 10, a near-end acoustic area 100 in which a near-end talker and the near-end terminal 1 are present, and a far-end acoustic area 200 in which a far-end talker and the far-end terminal 2 are present are set in advance. The near-end terminal 1 includes at least a transmission unit 11, a receiving unit 12, a recording unit 13, a display unit 15, and an input unit 16, and may further include a signal processing unit 14. The far-end terminal 2 includes at least a transmission unit 21, a receiving unit 22, and a recording unit 23, and may further include a signal processing unit 24. The evaluation value converting device 3 includes a subjective evaluation value presentation unit 31, a subjective evaluation value acquisition unit 32, an objective evaluation value acquisition unit 33, an analysis unit 34, and a conversion unit 35. An acoustic quality evaluation method according to the embodiment is implemented by the acoustic quality evaluation system 10 performing the processing of each step illustrated in FIGS. 3 and 7.

In the following description, the near-end talker who uses the near-end terminal 1 is an evaluator who gives a sample of a subjective evaluation value, and the far-end talker who uses the far-end terminal 2 is a call partner of a conversation that is a subject of subjective evaluation. However, the same call may be evaluated simultaneously by the near-end talker and the far-end talker. In this case, both the near-end talker and the far-end talker are evaluators and call partners. At this time, the near-end terminal 1 and the far-end terminal 2 have the same functional configuration, and the far-end terminal 2 further includes a display unit and an input unit. In addition, in the following description, although it is assumed that the acoustic quality of a two-party call between the near-end terminal 1 and the far-end terminal 2 is evaluated, a conference call between three or more persons including a plurality of far-end terminals 2 and the near-end terminal 1 may be evaluated.

The near-end terminal 1 and the far-end terminal 2 are connected via a voice communication network 4. The evaluation value converting device 3 is connected to the near-end terminal 1 and the far-end terminal 2 via a network which is not illustrated. However, in a case where the voice communication network 4 is capable of logically dividing a communication path for voice and a communication path for data through band control or the like, the near-end terminal 1 and the far-end terminal 2 may be connected to the evaluation value converting device 3 via the voice communication network 4. The voice communication network 4 is a circuit-switched or packet-switched communication network configured such that the connected devices can communicate with each other, and is configured assuming voice communication in particular. Specifically, the voice communication network 4 may be configured by the Internet, a wide area network (WAN), a local area network (LAN), a dedicated line, a public switched telephone network, a mobile telephone communication network, or the like.

The near-end terminal 1 and the far-end terminal 2 are, for example, a special device configured by loading a special program in a known or dedicated computer including a central processing unit (CPU), a main storage device (random access memory (RAM)), and the like. Each of the near-end terminal 1 and the far-end terminal 2 executes, for example, each processing operation under the control of the central processing unit. Data input to the near-end terminal 1 and the far-end terminal 2 and data obtained in each processing operation are stored in, for example, the main storage device, and the data stored in the main storage device is read out to the central processing unit as needed and used for other processing. At least a portion of the near-end terminal 1 and the far-end terminal 2 may be configured by hardware such as an integrated circuit. Specifically, the near-end terminal 1 and the far-end terminal 2 are mobile terminals such as smartphones or tablets, or information processing devices that include a voice transmission and reception function and a data communication function, such as desktop or laptop personal computers.

For example, the evaluation value converting device 3 is a special device configured by loading a special program in a known or dedicated computer including a central processing unit (CPU), a main storage device (random access memory (RAM)), and the like. For example, the evaluation value converting device 3 executes each processing operation under control of the central processing unit. Data input to the evaluation value converting device 3 and data obtained in each processing operation are stored in, for example, the main storage device, and the data stored in the main storage device is read out to the central processing unit as needed and used for other processing. At least a portion of the evaluation value converting device 3 may be configured by hardware such as an integrated circuit. Each storage unit included in the evaluation value converting device 3 can be configured by, for example, a main storage device such as a random access memory (RAM), an auxiliary storage device configured by a hard disk, an optical disc, or a semiconductor memory element such as a flash memory, or middleware such as a relational database or a key-value store. Specifically, the evaluation value converting device 3 is an information processing device that includes a data communication function and a data processing function, such as a desktop or a rack-mounted server computer.

Figure 3:
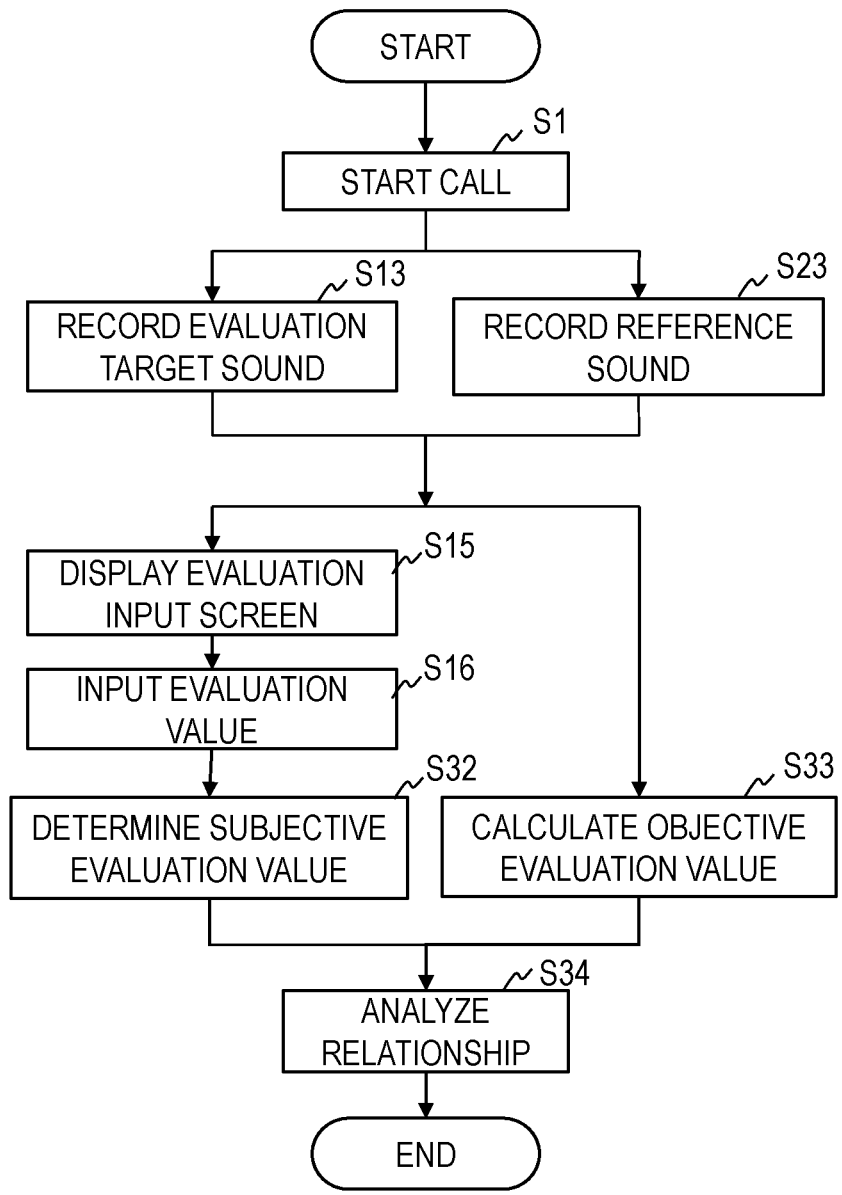
FIG. 3 is a diagram illustrating a processing procedure of an acoustic quality evaluation method.
Figure 7:
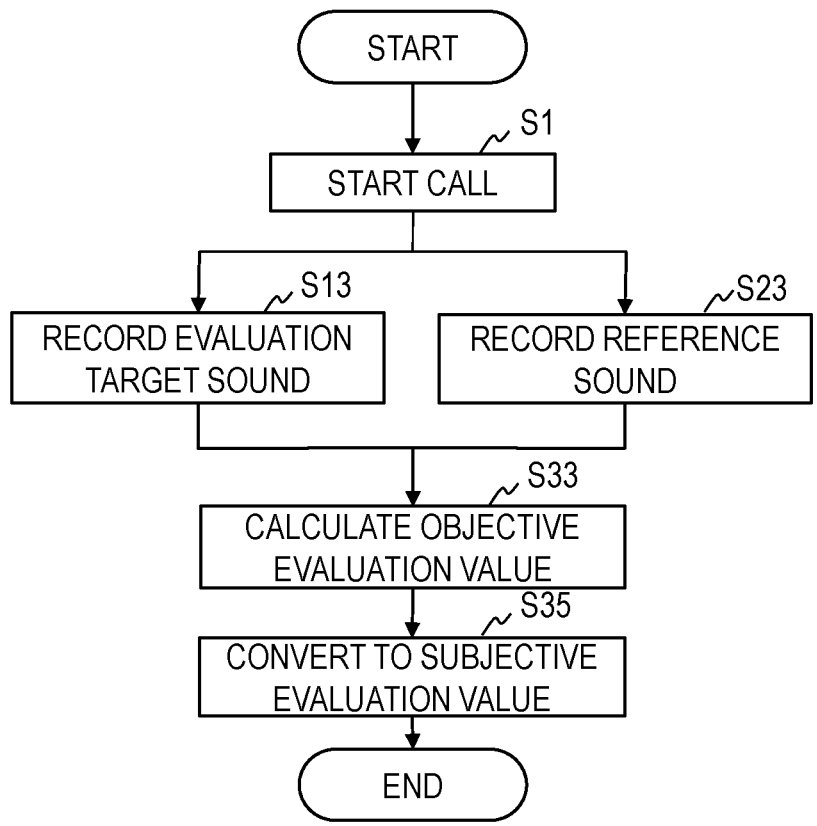
FIG. 7 is a diagram illustrating a processing procedure of the acoustic quality evaluation method.

The acoustic quality evaluation method according to the embodiment includes two stages of processing. The first stage is processing of analyzing a relationship between an objective evaluation value and a subjective evaluation value in order to convert the objective evaluation value into a subjective evaluation value. The second stage is processing of converting, based on the relationship between the objective evaluation value and the subjective evaluation value obtained in the first stage, an objective evaluation value calculated from an acoustic signal obtained by recording a conversation into a subjective evaluation value. FIG. 3 is a diagram illustrating an example of the relationship analysis processing in the first stage, and FIG. 7 is a diagram illustrating an example of the evaluation value conversion processing in the second stage.

Relationship Analysis Processing

Hereinafter, the processing of analyzing a relationship between an objective evaluation value and a subjective evaluation value in the acoustic quality evaluation method according to the embodiment will be described with reference to FIG. 3.

In step S1, the near-end terminal 1 and the far-end terminal 2 start a call to be evaluated for the acoustic quality. First, the near-end terminal 1 makes a call to the far-end terminal 2 in accordance with an operation of a near-end talker. The far-end terminal 2 responds to an incoming call from the near-end terminal 1 in accordance with an operation of a far-end talker. Thus, a call is established between the near-end terminal 1 and the far-end terminal 2. Here, although an example in which a call is made from the near-end terminal 1 to the far-end terminal 2 is described, a call may be established by the far-end terminal 2 making a call to the near-end terminal 1.

When the call is established, a voice emitted by the near-end talker is converted into an acoustic signal by a microphone M1 of the near-end terminal 1, and the transmission unit 11 transmits the acoustic signal to the receiving unit 22 of the far-end terminal 2. In a case in which the near-end terminal 1 includes the signal processing unit 14, the signal processing unit 14 performs signal processing including at least one of echo cancellation processing or noise cancellation processing on the acoustic signal transmitted to the far-end terminal 2. The receiving unit 22 of the far-end terminal 2 outputs the acoustic signal received from the transmission unit 11 of the near-end terminal 1, from a speaker S2 of the far-end terminal 2. A voice emitted by the far-end talker is converted to an acoustic signal by a microphone M2 of the far-end terminal 2, and at this time, wraparound voice of the near-end talker which is output from the speaker S2 of the far-end terminal 2 is superimposed on a voice of the far-end talker and then is converted to an acoustic signal. The transmission unit 21 of the far-end terminal 2 transmits the acoustic signal to the receiving unit 12 of the near-end terminal 1. In a case in which the far-end terminal 2 includes the signal processing unit 24, the signal processing unit 24 performs signal processing including at least one of echo cancellation processing or noise cancellation processing on the acoustic signal to be transmitted to the near-end terminal 1. The receiving unit 12 of the near-end terminal 1 outputs the acoustic signal received from the transmission unit 21 of the far-end terminal 2, from a speaker S1 of the near-end terminal 1. In this manner, the near-end talker and the far-end talker make a conversation via the call established between the near-end terminal 1 and the far-end terminal 2.

In step S13, the recording unit 13 of the near-end terminal 1 records the acoustic signal output from the speaker S1 by the receiving unit 12 of the near-end terminal 1, and transmits the recorded acoustic signal as an acoustic signal representing an evaluation target sound (which will be referred to as an "evaluation target acoustic signal" below), to the evaluation value converting device 3. The evaluation value converting device 3 inputs the evaluation target acoustic signal received from the recording unit 13 of the near-end terminal 1 to an objective evaluation value acquisition unit 33.

In step S23, the recording unit 23 of the far-end terminal 2 converts sound input to a microphone M3 of the far-end terminal 2 to an acoustic signal, and transmits the converted acoustic signal as an acoustic signal representing a reference sound (which will be referred to as a "reference acoustic signal" below), to the evaluation value converting device 3. The evaluation value converting device 3 inputs the reference acoustic signal received from the recording unit 23 of the far-end terminal 2 to the objective evaluation value acquisition unit 33.

The near-end terminal 1 may include the recording unit 23. In this case, the microphone M3 is disposed in the acoustic area in which the far-end terminal 2 is present, and the microphone M3 is connected to the recording unit 23 of the near-end terminal 1 using an audio cable laid from the microphone M3 to the acoustic area in which the near-end terminal 1 is present. Thus, it is possible to directly record a voice emitted by the far-end talker with the recording unit 23 of the near-end terminal 1.

In step S15, the subjective evaluation value presentation unit 31 of the evaluation value converting device 3 transmits a control signal for causing an evaluation input screen, to which the near-end talker inputs an evaluation for acoustic quality, to be displayed on the display unit 15 of the near-end terminal 1. The display unit 15 of the near-end terminal 1 displays the evaluation input screen in accordance with the received control signal. Evaluation categories classified into a plurality of levels for a plurality of predetermined evaluation viewpoints are displayed on the evaluation input screen. Evaluation values corresponding to the degree of quality in each of the evaluation viewpoints are assigned to the evaluation categories. It is assumed that the evaluation input screen is set so that only one evaluation category can be selected for each of the evaluation viewpoints.

The evaluation viewpoints include, for example, three criteria of "easiness to hear a voice of a partner", "feeling of noise", and "return of one's own voice". For the evaluation viewpoints of "easiness to hear a voice of a partner", for example, evaluation categories of five levels including "very easy to hear", "no problem to hear", "slightly difficult to hear", "difficult to hear", and "very difficult to hear" are provided, and evaluation values of 5, 4, 3, 2, and 1 are assigned to each of the evaluation categories in order. For the evaluation viewpoints of "feeling of noise", for example, evaluation categories of five levels including "no noise is present", "slight noise is present", "noise is present", "noise is significantly superimposed", and "noise is superimposed very much" are provided, and evaluation values of 5, 4, 3, 2, and 1 are assigned to each of the evaluation categories in order. For the evaluation viewpoints of "return of one's own voice", for example, evaluation categories of five levels including "one's own voice does not return at all", "one's own voice returns slightly", "one's own voice returns", "one's own voice returns loudly", and "one's own voice returns very loudly" are provided, and evaluation values of 5, 4, 3, 2, and 1 are assigned to each of the evaluation categories in order. A relationship between the evaluation viewpoints, the evaluation categories, and the evaluation values described in the above example can be summarized as follows.

TABLE 1

| EASINESS TO HEAR VOICE OF PARTNER | FEELING OF NOISE | RETURN OF ONE'S OWN VOICE | EVALUATION VALUE |
| --- | --- | --- | --- |
| Very easy to hear | No noise is present | One's own voice does not return at all | 5 |
| No problem to hear | Slight noise is present | One's own voice returns slightly | 4 |
| Slightly difficult to hear | Noise is present | One's own voice returns | 3 |
| Difficult to hear | Noise is significantly superimposed | One's own voice returns loudly | 2 |
| Very difficult to hear | Noise is superimposed very much | One's own voice returns very loudly | 1 |

Figure 4:
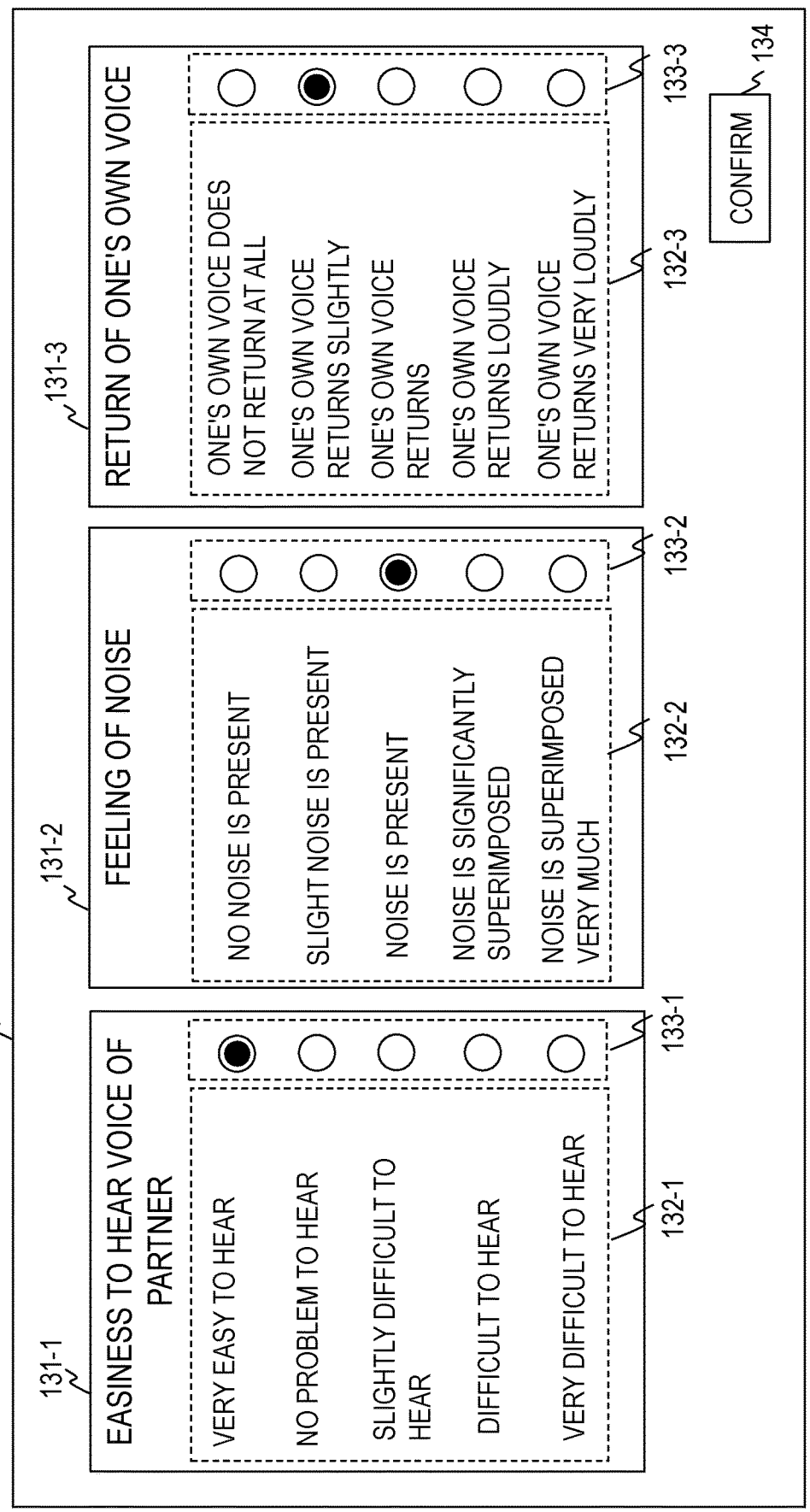
FIG. 4 is a diagram illustrating display content of an evaluation input screen.

FIG. 4 illustrates an evaluation input screen for inputting evaluation based on the evaluation categories in the example described above. On an evaluation input screen 130, an area 131-1 corresponding to the evaluation criterion of "easiness to hear a voice of a partner", an area 131-2 corresponding to the evaluation criterion of "feeling of noise", and an area 131-3 corresponding to the evaluation criterion of "return of one's own voice" are provided. In the area 131-1, a label 132-1 representing the evaluation categories obtained by classifying the "easiness to hear a voice of a partner" into five levels is displayed, and five buttons 133-1 are provided for each of the evaluation categories in a one-to-one manner. The button 133-1 has a function to switch a selection state and is designed such that only one can be selected in the area 131-1. For example, the button 133-1 includes option buttons with a group set in the area 131-1. Labels 132-2 and 132-3, and buttons 133-2 and 133-3 are similarly provided for the area 131-2 and the area 131-3, respectively. FIG. 4 illustrates an example of a design of the evaluation input screen, and the evaluation input screen may have a different design in consideration of convenience of operation and the like.

In step S16, the near-end talker listens to a voice output from the speaker S1 of the near-end terminal 1 and evaluates the acoustic quality of the voice. The evaluation of the acoustic quality is performed on the evaluation input screen displayed on the display unit 15 by selecting an evaluation category that is considered to be the most relevant to each evaluation criterion based on the subjectivity of the near-end talker. In the example of the evaluation input screen 130 in FIG. 4, the near-end talker selects the most relevant evaluation category to the "easiness to hear a voice of a partner", and the button 133-1 corresponding to the label 132-1. Similarly, the near-end talker selects the buttons 133-2 and 133-3 respectively corresponding to the most relevant evaluation category to "feeling of noise" and the most relevant evaluation category to "return of one's own voice". The near-end talker selects the evaluation categories for all evaluation viewpoints, and then presses on a confirmation button 134. The input unit 16 of the near-end terminal 1 transmits the evaluation values assigned to each of the selected evaluation categories to the evaluation value converting device 3 in accordance with the selection state on the evaluation input screen 130. The evaluation value converting device 3 inputs the evaluation values for each of the evaluation viewpoints received from the input unit 16 of the near-end terminal 1 to the subjective evaluation value acquisition unit 32.

In step S32, the subjective evaluation value acquisition unit 32 of the evaluation value converting device 3 determines one subjective evaluation value related to the acoustic quality based on the evaluation value for each evaluation criterion which has been received from the input unit 16 of the near-end terminal 1. Specifically, the subjective evaluation value acquisition unit 32 determines the lowest evaluation value among the evaluation values for each of the evaluation viewpoints as a subjective evaluation value for the acoustic quality. In the example of FIG. 4, because the evaluator has selected "very easy to hear" (the evaluation value is 5) for "easiness to hear a voice of a partner", "noise is present" (the evaluation value is 3) for "feeling of noise", and "one's own voice returns slightly" (the evaluation value is 4) for "return of one's own voice", the subjective evaluation value is determined to be "3" that is the lowest evaluation value. The subjective evaluation value acquisition unit 32 outputs the determined subjective evaluation value to the analysis unit 34.

In step S33, the objective evaluation value acquisition unit 33 of the evaluation value converting device 3 acquires an objective evaluation values corresponding to the evaluation target acoustic signal received from the recording unit 13 and the reference acoustic signal received from the recording unit 23. The objective evaluation value is, for example, a PESQ value described in Non Patent Literature 2. The calculation process of the PESQ value includes a process to correct a time shift between the evaluation target acoustic signal and the reference acoustic signal. The objective evaluation value acquisition unit 33 outputs the calculated objective evaluation value to the analysis unit 34.

In step S34, the analysis unit 34 of the evaluation value converting device 3 analyzes a linear relationship between the subjective evaluation value received from the subjective evaluation value acquisition unit 32 and the objective evaluation value received from the objective evaluation value acquisition unit 33. At this time, the analysis unit 34 performs statistical analysis by obtaining subjective evaluation values and objective evaluation values to be used for the analysis from various combinations of conversations between a plurality of evaluators and a plurality of call partners in the form of reducing dependency on the reference acoustic signal or the evaluation target acoustic signal or dependency on individual differences of the evaluators. The analysis unit 34 sets information representing the linear relationship obtained from the analysis to the conversion unit 35. Here, the information representing the linear relationship is a linear function F representing a straight line with a predetermined slope a, a parameter specifying the linear function F, and the like.

Figure 5:
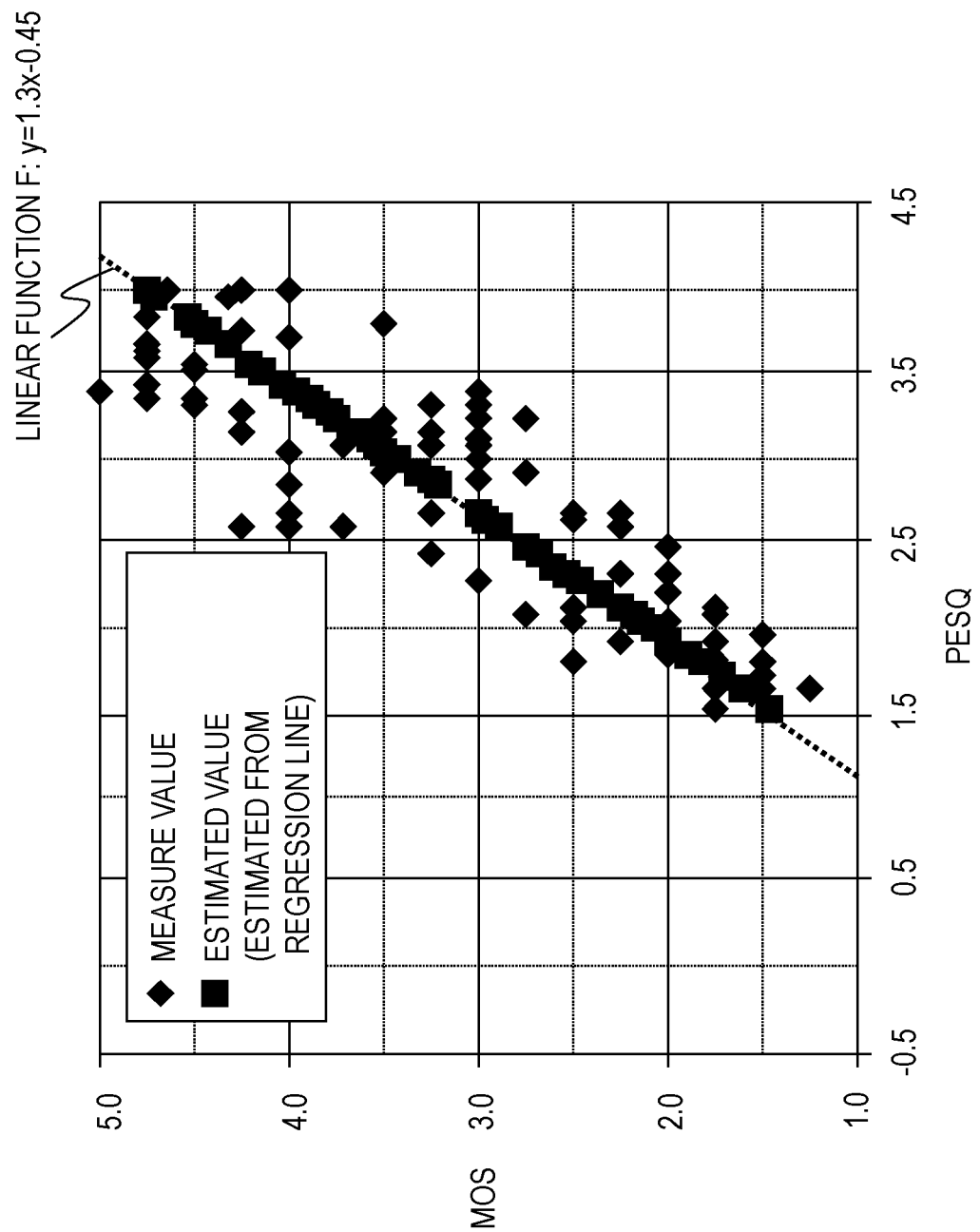
FIG. 5 is a diagram illustrating a relationship between subjective evaluation values and objective evaluation values.

FIG. 5 is a graph representing the relationship between the subjective evaluation values and the objective evaluation values obtained using the method described above. The vertical axis represents subjective evaluation values by a conversational test (mean opinion score or MOS), and the horizontal axis represents objective evaluation values (PESQ). The diamond-shaped marks represent measured values in the conversational test, and the square marks on the dashed line represent estimated values based on their linear relationship of the measured values (values estimated from regression analysis). As shown in this figure, it can be seen that the MOS and PESQ values can be approximated in the linear relationship. The linear function F represented by the regression line shown in FIG. 5 is a linear function y=ax+b with a predetermined slope a and an intercept b. Wherein x represents a PESQ value and y represents an MOS value. a is 1.3 or close to 1.3, and b is −0.45 or close to −0.45. Further, "close to $\alpha$" refers to a value that belongs to a range of $\alpha$-$\delta_1$ or greater and $\alpha$-$\delta_2$ or less. However, $\delta_1$ and $\delta_2$ are positive values, and $\delta_1$ may be equal to $\delta_2$ or $\delta_1$ may not be equal to $\delta_2$. Examples of $\delta_1$ and $\delta_2$ are the value of 20% of |$\alpha$|. In other words, a is a value in the range from 1.04 to 1.56, and b is a value in the range from −0.36 to −0.54.

In order to obtain a linear relationship between a subjective evaluation value and an objective evaluation value, the subjective evaluation value and the objective evaluation value need to be involved with the same conversation. At this time, if a target conversation is too long, the subjective evaluation value and the objective evaluation value do not match and an appropriate linear relationship may not be obtained. To avoid this, it is better to set a conversation to be evaluated to have an appropriate length. The appropriate length may be, for example, approximately 20 seconds or may be a length according to a desired standard.

Although subjective evaluation values are determined for 5-level evaluation categories in a conversational test of the related art, in the present embodiment, the lowest evaluation value is determined to be a subjective evaluation value using the evaluation category classified into a plurality of levels for each of the plurality of evaluation viewpoints. Call environments with low acoustic quality such as smartphones and mobile telephones have become widespread in recent years, and evaluators who are accustomed to such call environments with low acoustic quality have a low standard for the acoustic quality, and thus the evaluator tends to give a high evaluation value, for example, regarding that acoustic quality is good if a voice of a partner can be listened. Thus, in a case in which subjective evaluation is performed in a conversational test of the related art, there is a problem in that there is a bias toward higher evaluation values, which makes it difficult to obtain a proper evaluation value. The inventors of the present invention have discovered that this problem can be avoided by introducing a plurality of evaluation viewpoints as in the acoustic quality evaluation system of the embodiment and setting the lowest evaluation value among evaluation values selected in each of the evaluation viewpoints as a subjective evaluation value. In particular, it is assumed that, in evaluation according to the ICC system, there is less noise when a vehicle is stopped, and a lot of driving sounds and environmental noise when a vehicle is traveling. In other words, there are cases in which high call quality is assumed and low call quality is assumed. Thus, appropriate evaluation values need to be acquired regardless of the level of call quality. In particular, it is assumed that an appropriate subjective evaluation value can be acquired by configuring evaluation values as described above.

FIG. 6 shows experimental results of the evaluation test performed by the acoustic quality evaluation system in the embodiment. In the test, four experimental conditions I to IV were set, and four evaluators performed a conversational test each three times for four days while switching communication partners under the experimental conditions. The experimental condition I is a condition in which the sound is clearly good and is assumed to be assigned with the evaluation value 4 or 5 (in other words, there would be no person who is assigned with the evaluation value 1 or 2). The experimental condition II is a condition in which the sound is clearly bad and is assumed to be assigned with the evaluation value 1 or 2 (in other words, there would be no person who is assigned with the evaluation value 4 or 5). The experimental condition III is a condition in which the sound is relatively good among sounds determined to be fair by many people and is assumed to be assigned with the evaluation value 3 or 4 (in other words, there would be no person who is assigned with the evaluation value 1). The experimental condition IV is a condition in which the sound is relatively bad among sounds determined to be fair by many people and is assumed to be assigned with the evaluation value 2 or 3 (in other words, there would be no person who is assigned with the evaluation value 5). Under each of the experimental conditions, a conversational test was performed using the evaluation categories of the related art ("excellent", "good", "slightly bad", "bad", and "very bad") and the evaluation categories of the embodiment (evaluation categories of five levels for each of three evaluation viewpoints are set), and the averages of the evaluation values were aggregated. It was seen as illustrated in FIG. 6 that, although it was possible to obtain the evaluation values in the range of estimated evaluation values in the evaluation categories of the embodiment, in the evaluation categories of the related art, higher evaluation values than assumed were assigned under the experimental conditions II and IV in which particularly lower evaluation values had been assumed to be assigned. That is, it can be said that this experiment has proven that even an evaluator who tends to give a high evaluation value in the evaluation categories of the related art can obtain the appropriate evaluation values if the evaluation categories of the embodiment are used.

Evaluation Value Conversion Processing

Hereinafter, a process to convert an objective evaluation value to a subjective evaluation value in the acoustic quality evaluation method of the embodiment will be described with reference to FIG. 7. Further the process from step S1 to step S33 is the same as the relationship analysis process described above, and thus description thereof is omitted here.

In step S35, the conversion unit 35 of the evaluation value converting device 3 linearly converts an objective evaluation value received from the objective evaluation value acquisition unit 33 into a subjective evaluation value based on a preset linear relationship from the analysis unit 34, to obtain an estimated value of the subjective evaluation value. For example, the conversion unit 35 obtains the result obtained by substituting the objective evaluation value into x of the linear function y=ax+b that is set in advance by the analysis unit 34 as an estimated value of the subjective evaluation value. The conversion unit 35 sets the obtained estimated value of the subjective evaluation value as the output of the evaluation value converting device 3.

Variant Example 1

Figure 8:
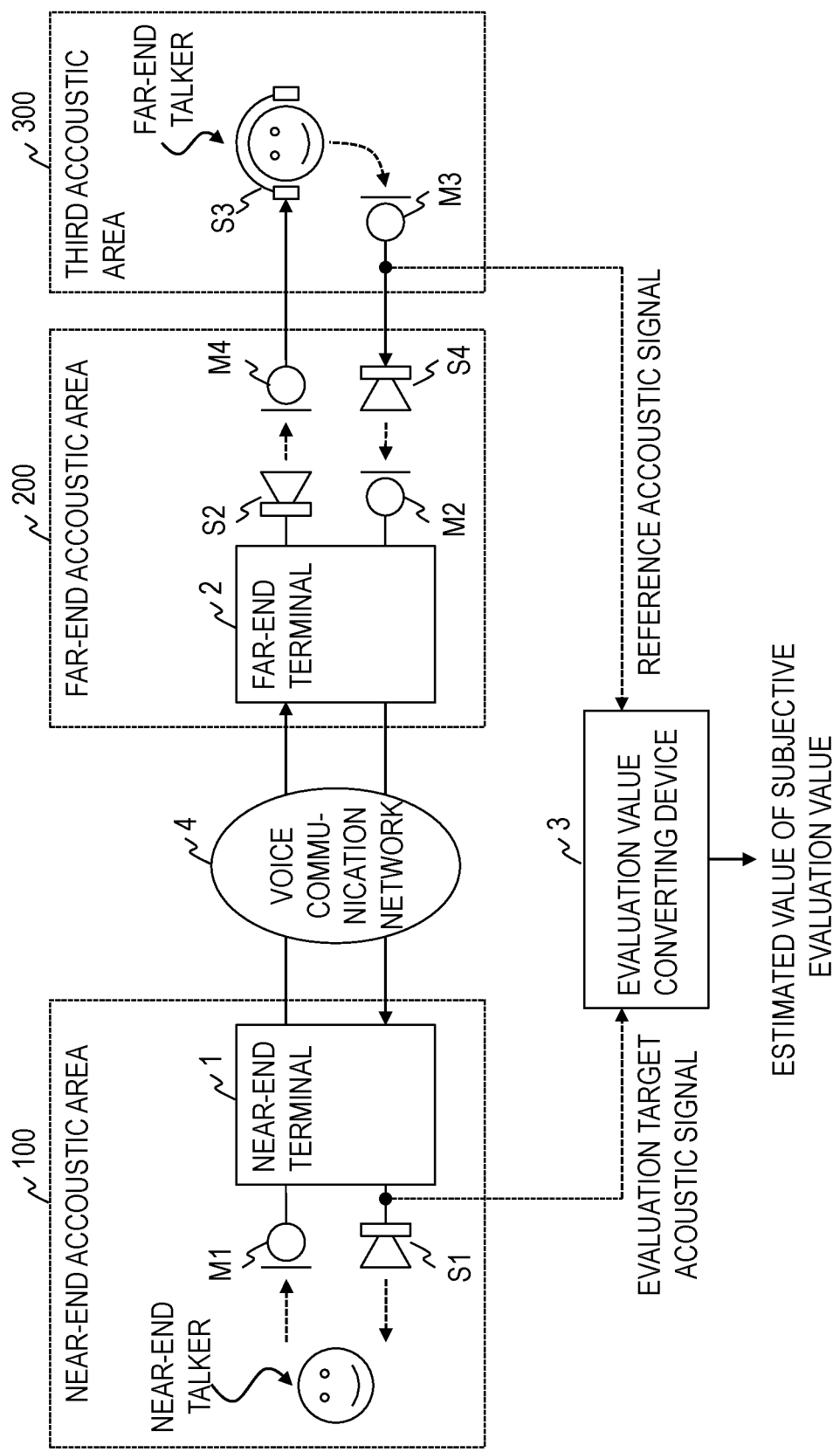
FIG. 8 is a diagram illustrating a functional configuration of an acoustic quality evaluation system according to a variant example 1.

FIG. 8 illustrates a first variant example of the acoustic quality evaluation system according to the embodiment. In the acoustic quality evaluation system of the first variant example, it is characterized that an acoustic area in which the far-end talker is present and an acoustic area in which the far-end terminal 2 is present are separated. Hereinafter, differences from the acoustic quality evaluation system of the embodiment will be mainly described. Although the far-end terminal 2 is present in a far-end acoustic area 200, similarly to the embodiment, the far-end talker is present in a third acoustic area 300 that is different from the far-end acoustic area 200. Although the speaker S2 and the microphone M2 included in the far-end terminal 2 are disposed in the far-end acoustic area 200 as in the embodiment, a microphone M3 for recording a voice emitted by the far-end talker is disposed in the third acoustic area 300. The far-end talker wears a sealed-type speaker S3, such as headphones. A speaker S4 connected to the microphone M3 with an audio cable, or the like, and a microphone M4 connected to the sealed-type speaker S3 with an audio cable, or the like are disposed in the far-end acoustic area 200. A voice of the near-end talker output from the speaker S2 of the far-end terminal 2 is collected by the microphone M4 of the far-end acoustic area 200 and emitted from the sealed-type speaker S3 in a third acoustic area 300 to be listened by the far-end talker. A voice emitted by the far-end talker is collected by the microphone M3 in the third acoustic area 300 and is emitted from the speaker S4 in the far-end acoustic area 200. In addition, the voice of the far-end talker that has been emitted from the speaker S4 is converted to an acoustic signal by the microphone M2 of the far-end terminal 2, and emitted from the speaker S1 of the near-end terminal 1 to be listened by the near-end talker. At this time, an evaluation target sound to be used for objective evaluation is recorded when it is output from the speaker S1 of the near-end terminal 1, and a reference sound is recorded when it is input to the microphone M3.

As in the embodiment, in a case in which the speaker S2 on the far-end talker side and the microphone M3 for recording the reference sound are present in the same acoustic area, the wraparound voice of the near-end talker output from the speaker S2 may be superimposed on the reference sound and recorded, or ambient noise on the far-end talker side may be superimposed on the reference sound and recorded. An unnecessary acoustic signal which is not based on a voice signal of the far-end talker, such as the wraparound voice of the near-end talker or the ambient noise is also referred to as interfering sound, and if interfering sound is mixed with the reference sound, it may hinder correct calculation of an objective evaluation value. If a speaker for the far-end talker to hear a voice of the near-end talker is set to a sealed type and the reference sound is recorded in an acoustic area different from that of the far-end terminal as in the first variant example, it is possible to reduce interference sound superimposed on the reference sound. Thus, more accurate objective evaluation values can be acquired, and a more appropriate linear relationship can be obtained.

Variant Example 2

Figure 9:
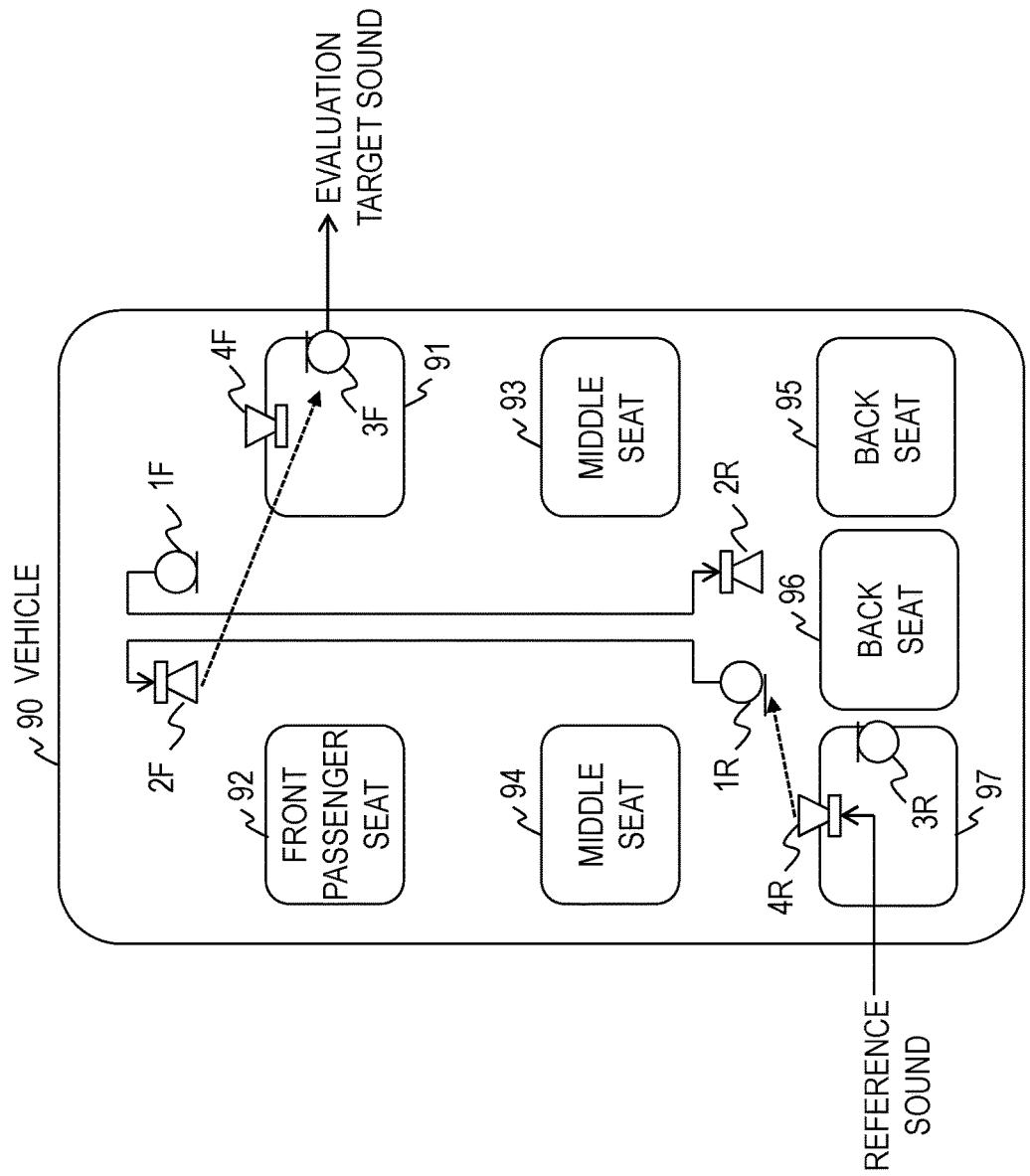
FIG. 9 is a diagram for describing an example of acoustic quality evaluation in ICC system.

A method for evaluating the acoustic quality of ICC system will be described with reference to FIG. 9. ICC system supports conversations made between people seated on each seat using microphones 1F and 1R and speakers 2F and 2R installed in a vehicle 90. For example, a voice signal collected by the microphone 1F (1R) is subjected to signal processing such as echo cancellation or gain control, and then emitted from the speaker 2R (2F). The microphone 1 may be installed in each seat row in the vehicle or may be installed at each seat. As illustrated in FIG. 9, microphones may be installed only in front of the first row (e.g., on the dashboard or around the room mirror) and between the second row and the third row (e.g., the floor or ceiling surface between the middle and back seats).

When the acoustic quality of ICC system is evaluated, evaluation is performed for across seats and rows. Hereinafter, as an example in which evaluation is performed for across seats, a method for estimating a subjective evaluation value for between a driver's seat 91 and a back seat 97 without using an evaluator will be described. A microphone 3F and a speaker 4F are installed at the driver's seat 91, and a microphone 3R and a speaker 4R are installed at the back seat 97. Each speaker is placed at a position corresponding to the position of the mouth of a person when he or she is seated on the seat. That is, the speaker is installed at the center between the left and right sides of the seat and in the front. Each microphone is placed at a position corresponding to the position of an ear of a person when he or she is seated on the seat. That is, the microphone is installed at the center between the front and back side and on the left side or the right side. For example, the speaker 4F is desirably installed at the position corresponding to the mouth of an evaluator when the evaluator is assumed to be seated on the driver's seat in the direction in which sound is emitted forward, and the microphone 3F is desirably installed at a position corresponding to the left ear or the right ear of the evaluator when the evaluator is assumed to be seated on the driver's seat. Two or more microphones may be installed at each seat, for example, two locations corresponding to the left and right ears of the evaluator.

In the vehicle 90 in which microphones and speakers are disposed as described above, a pre-recorded voice signal is emitted from the speaker 4R installed at the back seat 97. A voice signal emitted from the speaker 4R is collected by the microphone 1R, is subjected to signal processing such as echo cancellation or gain control, and then is emitted from the speaker 2R. A voice signal emitted from the speaker 2F is collected by the microphone 3F installed at the driver's seat 91. The pre-recorded voice signal is taken as a reference acoustic signal, and the voice signal collected by the microphone 3F is taken as an evaluation target acoustic signal to obtain an objective evaluation value. The objective evaluation value obtained as described above is converted based on the linear function F obtained in advance and thus a subjective evaluation value can be estimated. Here, although an example in which quality evaluation is performed for a conversation between the driver's seat 91 and the back seat 97 has been described, the seats and the rows may be combined in any way.

By using the present invention as described above, a subjective evaluation value can be obtained without using an evaluator for each vehicle situation in which quality evaluation in ICC system needs to be performed. Here, a situation of a vehicle is intended to be a factor that change sound collected by a microphone installed in the vehicle, such as stopping or traveling of the vehicle, a difference in speed when the vehicle is traveling, a noise level inside the vehicle, such as a window open or closed state, music, and the like.

Third Modified Example

A method for evaluating the acoustic quality of ICC system using the acoustic quality evaluation system 10 illustrated in FIG. 2 has been described in the second variant example. Here, it is assumed that the evaluation target acoustic signal reaches passing through the ICC system. However, because the plurality of acoustic areas are set in the same vehicle in the ICC system, a voice signal emitted from a speaker installed in one acoustic area may directly reach a microphone located in the other acoustic area without passing through the ICC system. Thus, it is necessary to assume in the quality evaluation of the ICC system that an evaluation target acoustic signal includes a voice signal coming in other acoustic paths. In addition, in the second variant example, a unidirectional single conversation made from a passenger seated on a first seat to a passenger seated on a second seat is assumed. However, because the ICC system is intended to support a conversation between passengers in a vehicle, a bidirectional double talk in which a conversation from the passenger seated on the second seat to a passenger seated on the first seat takes place at the same time needs to be assumed. That is, in the acoustic quality evaluation system of the third variant example, the quality of unidirectional or bidirectional voices in a conversation conducted using the ICC system is evaluated.

Figure 10:
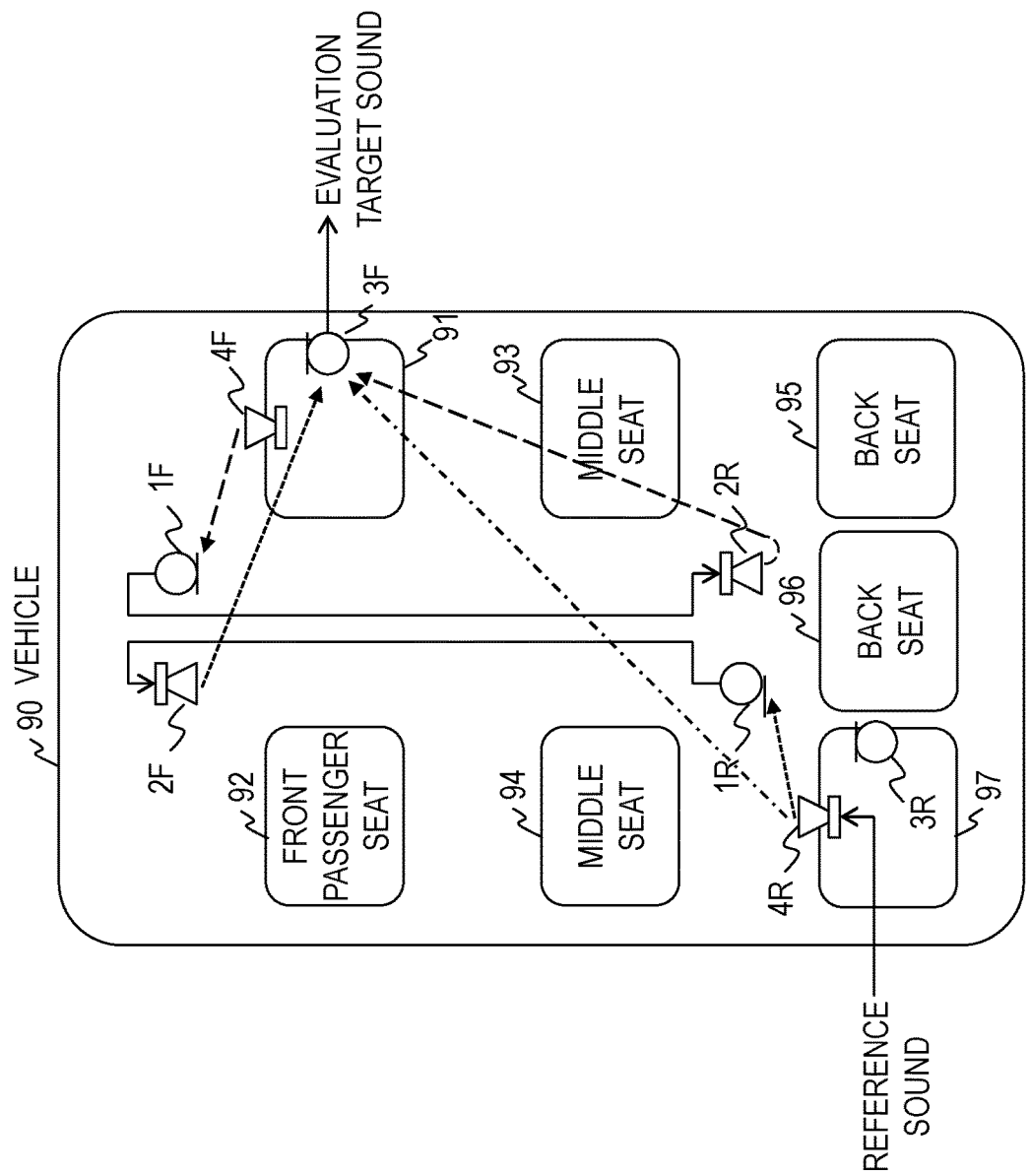
FIG. 10 is a diagram for describing an example of acoustic quality evaluation in ICC system.

FIG. 10 illustrates acoustic paths assumed in the third variant example. Here, it is assumed that a near-end talker (evaluator) is seated on the driver's seat 91, and a far-end talker (call partner) is seated on a back seat 97. The dotted lines shown in FIG. 10 are the acoustic path assumed in the second variant example and an acoustic path on which the reference acoustic signal emitted from the speaker 4R reaches the microphone 3F via the ICC system. The dash-dot-dash line shown in FIG. 10 is an acoustic path for direct sound and an acoustic path on which the reference acoustic signal emitted from the speaker 4R reaches the microphone 3F directly without passing through the ICC system. The dashed lines shown in FIG. 10 are an acoustic path on the assumption of a double talk and an acoustic path on which a voice signal emitted from the speaker 4F is emitted from the speaker 2R passing through the ICC system and reaches the microphone 3F through a space inside the vehicle. In the acoustic path assuming double talk, an echo is generated by collecting voice signals emitted from the speaker 2F by the microphone 1F. Therefore, it is also assumed that a component of the echo which is not erased is emitted from the speaker 2R.

Figure 11:
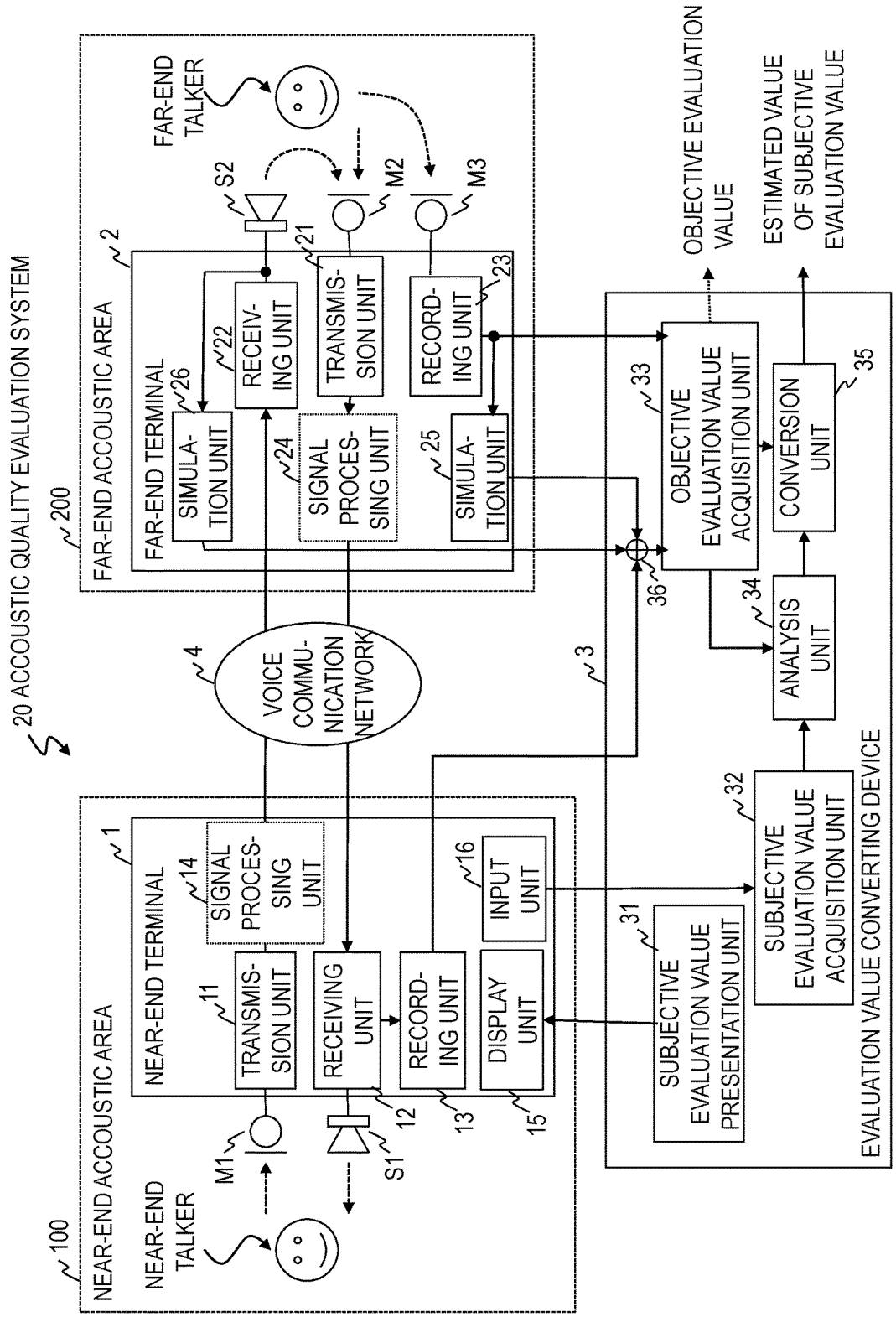
FIG. 11 is a diagram illustrating a functional configuration of the acoustic quality evaluation system.

An acoustic quality evaluation system 20 of the third variant example further includes two simulation units 25 and 26 in the far-end terminal 2 of the acoustic quality evaluation system 10 according to the embodiment, and the evaluation value converting device 3 further includes an addition unit 36, as illustrated in FIG. 11. The simulation unit 25 receives input of an acoustic signal output by the recording unit 23 and transmits a simulated acoustic signal that has been subjected to predetermined signal processing to reflect the transmission characteristics of the acoustic path for direct sound, to the evaluation value converting device 3. The simulation unit 26 receives input of an acoustic signal output by the receiving unit 22 and transmits a simulated acoustic signal that has been subjected to predetermined signal processing to reflect the transmission characteristics of the acoustic path on the assumption of a double talk, to the evaluation value converting device 3. The evaluation value converting device 3 inputs the acoustic signal received from the recording unit 23, the simulated acoustic signal received from the simulation unit 25, and the simulated acoustic signal received from the simulation unit 26 to the addition unit 36. The addition unit 36 inputs the acoustic signal obtained by adding the three input acoustic signals to the objective evaluation value acquisition unit 33 as an evaluation target acoustic signal. The objective evaluation value acquired by the objective evaluation value acquisition unit 33 may be output of the evaluation value converting device 3 as is, or may be subjected to the above-described linear conversion by the conversion unit 35 to acquire an estimated value of a subjective evaluation value.

When an acoustic signal or a voice signal is input, the simulation unit 25 and 26 output a conversion signal that has undergone conversion processing to reflect the transmission characteristics of the corresponding acoustic path. The conversion processing may be signal processing to reflect inter-seat transmission characteristics acquired in advance, or may be hardware such as a signal attenuator (attenuator) considering a distance between seats or noise in a vehicle. In addition, the simulation units 25 and 26 may be combined with a delayer that delays a signal in consideration of a propagation speed of sound in a space. If a distance between seats in a vehicle is set to a range in which a delay difference is negligible, the delayer may not be used, and only the conversion processing to reflect the transmission characteristics as described above may be performed. The simulation unit 25 and the simulation unit 26 have a common function in that they reflect the transmission characteristics of the acoustic paths. Thus, in a case in which the transmission characteristics of the corresponding acoustic paths are equal (or similar), it may be configured to perform the same conversion processing on each input signal with only one simulation unit.

The acoustic quality evaluation system 20 of the third variant example evaluates the acoustic quality by including a component simulating the acoustic path generated by the near-end acoustic area and the far-end acoustic area being in the same space in the evaluation target acoustic signal. With this configuration, the acoustic quality evaluation system 20 of the third variant example can perform the quality evaluation of the ICC system that supports a conversation in the same vehicle, for example, with high accuracy.

According to the acoustic quality evaluation systems of the above-described embodiment and the variant examples, it is sufficient to perform a minimum conversational test to obtain a linear relationship for converting an objective evaluation value to a subjective evaluation value, and quality evaluation of the loudspeaker hands-free communication system can be performed through a few number of conversational tests. In addition, if the linear relationship is known, quality evaluation can be performed without performing the conversational test. In particular, although it is assumed that the number of test cases is enormous in such a loudspeaker hands-free communication system with a variety of use situations and communication paths as in the ICC system, it is possible to perform quality evaluation with a few number of conversational tests or without a conversational test, and thus costs required for the quality evaluation can be expected to be reduced.

Although the embodiments of the present invention have been described, a specific configuration is not limited to the embodiments, and appropriate changes in the design are, of course, included in the present invention within the scope of the present invention departing from the gist of the present invention. The various processes described in the embodiments are not only executed in the described order in a time-series manner but may also be executed in parallel or separately as necessary or in accordance with a processing capability of the device that performs the processing.

Program and Recording Medium

When various processing functions in each device described in the aforementioned embodiments are implemented by a computer, processing details of the functions that each device should have are described in a program. In addition, when the program is executed by the computer, the various processing functions of each device described above are implemented on the computer.

The program in which the processing details are described can be recorded in a computer-readable recording medium. The computer-readable recording medium can be any type of medium, for example, a magnetic recording device, an optical disc, a magneto-optical recording medium, a semiconductor memory, or the like.

In addition, the program is distributed, for example, by selling, giving, or lending a portable recording medium such as a DVD or a CD-ROM with the program recorded on it. Further, the program may be stored in a storage device of a server computer and transmitted from the server computer to another computer via a network, so that the program is distributed.

For example, a computer that executes the program first temporarily stores the program recorded on a portable recording medium or the program transmitted from the server computer in its own storage device. In addition, when processing is executed, the computer reads the program stored in its own storage device and executes the processing in accordance with the read program. In addition, as another form of execution of the program, a computer may read the program directly from a portable recording medium and execute processing in accordance with the program, and further, each time the program is transmitted from the server computer to the computer, the computer may execute processing in order in accordance with the received program. In addition, the processing may be executed through a so-called application service provider (ASP) service in which processing functions are implemented just by issuing an instruction for execution and obtaining the result without transmission of the program from the server computer to the computer. Further, the program in this form is assumed to include data which is information provided for processing of a computer and is equivalent to a program (data or the like that has the property of defining processing of the computer although it is not a direct command to a computer).

In addition, although the present device is configured by executing a predetermined program on a computer in this form, at least a part of the processing details may be implemented by hardware.

The invention claimed is:

1. An evaluation apparatus for evaluating quality of a conversation made between a first sound source in a first acoustic area of a plurality of acoustic areas in the vehicle and a second source in a second acoustic area of the plurality of acoustic areas in the vehicle, the evaluation apparatus comprising a processor configured to execute operations comprising:

receiving, by a first microphone in the first acoustic area, a first voice signal originated from the first sound source in the first acoustic area for the conversation, wherein the first acoustic area comprises a first microphone and a first speaker, and the second acoustic area comprises a second microphone and a second speaker, the first acoustic area and the second acoustic area are distinct, and the first voice signal represents a reference sound signal;

transmitting the first voice signal over a communication line between the first microphone and the second speaker;

emitting, by the second speaker in the second acoustic area, a second voice signal, wherein the second voice signal is based on the transmitted first voice signal from the first microphone;

receiving, by the second microphone in the second acoustic area, the second voice signal;

receiving, by the second microphone in the second acoustic area, the first voice signal, wherein the first voice signal has traveled over air from a first speaker in the first acoustic area to the second acoustic area;

generating an evaluation target sound signal by adding the received first voice signal and the received second voice signal; and acquiring, based at least on the evaluation target sound signal and the reference sound signal, an evaluation value, wherein the evaluation value describes a quality of the conversation across the first acoustic area and the second acoustic area in the vehicle, the evaluation value includes a process to correct a time shift between the evaluation target sound signal and the reference sound signal.

2. The evaluation apparatus according to claim 1,
wherein the first speaker is configured to emit a third voice signal based on the second voice signal received by the second microphone, and the acquiring the evaluation value further comprises using, as the evaluation target sound signal, a fourth voice signal obtained by further adding a fifth voice signal obtained from a sixth voice signal emitted from a second sound source in the second acoustic area, collected by the second microphone in the second acoustic area, and emitted from the first speaker in the first acoustic area.

3. The evaluation apparatus according to claim 2, the processor further configured to execute operations comprising:

acquiring a simulated voice signal obtained by reflecting, in an aggregated voice signal emitted from the first speaker, a characteristic of transmission between the first speaker and the second acoustic area, wherein the acquiring further comprises using the simulated voice signal as the aggregated voice signal obtained from the second voice signal emitted from the second sound source in the second acoustic area, collected by the second microphone, and emitted from the first speaker.

4. The evaluation apparatus according to claim 1, the processor further configured to execute operations comprising:

acquiring a simulated voice signal obtained by reflecting, in a third voice signal obtained from the first voice signal collected by the first microphone, a characteristic of transmission between the first sound source of the first acoustic area and the second acoustic area, wherein the acquiring further comprises using the simulated voice signal as a fourth voice signal obtained from the first voice signal transmitted through the air inside the vehicle and reaching the second acoustic area.

5. The evaluation apparatus according to claim 1,
wherein the evaluation value represents an objective evaluation value relating to the quality of the conversation, and the processor further configured to execute operations comprising converting the objective evaluation value to a subjective evaluation value.

6. The evaluation apparatus according to claim 5,
wherein the converting further comprises linearly converting the objective evaluation value to obtain the subjective evaluation value based on a linear relationship obtained from a subjective evaluation value acquired in a conversational test performed across two acoustic areas of the plurality of acoustic areas and an objective evaluation value acquired using an evaluation target sound and a reference sound obtained by recording a voice of the conversational test.

7. The evaluation apparatus according to claim 5,
wherein the converting further comprises obtaining, as the subjective evaluation value, $y=ax+b$, where x is the objective evaluation value, a is 1.3 or close to 1.3, and b is $-0.45$ or close to $-0.45$.

8. An evaluation method for evaluating quality of a conversation made between a first sound source in a first acoustic area and a second sound source in a second acoustic area across the first acoustic area and the second acoustic area in a vehicle, comprising:

receiving, by a first microphone in the first acoustic area, a first voice signal originated from the first sound source in the first acoustic area for the conversation, wherein the first acoustic area comprises a first microphone and a first speaker, and the second acoustic area comprises a second microphone and a second speaker, the first acoustic area and the second acoustic area are distinct, and the first voice signal represents a reference sound signal;

transmitting the first voice signal over a communication line between the first microphone and the second speaker;

emitting, by the second speaker in the second acoustic area, a second voice signal, wherein the second voice signal is based on the transmitted first voice signal from the first microphone;

receiving, by the second microphone in the second acoustic area, the second voice signal;

receiving, by the second microphone in the second acoustic area, the first voice signal, wherein the first voice signal has traveled over air from a first speaker in the first acoustic area to the second acoustic area;

generating, by an evaluation value converting device, an evaluation target sound signal by adding the received first voice signal and the received second voice signal; and acquiring, by an objective evaluation value acquisition unit, based at least on the evaluation target sound signal and the reference sound signal, an evaluation value, wherein the evaluation value describes a quality of the conversation across the first acoustic area and the second acoustic area in the vehicle, the evaluation value includes a process to correct a time shift between the evaluation target sound signal and the reference sound signal.

9. The evaluation method according to claim 8,
wherein the first speaker is configured to emit a third voice signal based on the second voice signal received by the second microphone, and the acquiring further comprises using, as the evaluation target sound signal, a fourth voice signal obtained by further adding a fifth voice signal obtained from a sixth second voice signal emitted from a second sound source in the second acoustic area, collected by the second microphone in the second acoustic area, and emitted from the first speaker in the first acoustic area.

10. The evaluation method according to claim 9, further comprising:

acquiring a simulated voice signal obtained by reflecting, in an aggregated voice signal emitted from the first speaker, a characteristic of transmission between the first speaker and the second acoustic area, wherein the acquiring the evaluation value further comprises using the simulated voice signal as the aggregate voice signal obtained from the second voice signal emitted from the second sound source in the second acoustic area, collected by the second microphone, and emitted from the first speaker.

11. The evaluation method according to claim 8, further comprising:
acquiring a simulated voice signal obtained by reflecting, in a third voice signal obtained from the first voice signal collected by the first microphone, a characteristic of transmission from the first sound source of the first acoustic area to the second acoustic area,
wherein the acquiring the evaluation value further comprises using the simulated voice signal as a fourth voice signal obtained from the first voice signal transmitted through the air inside the vehicle and reaching the second acoustic area.

12. The evaluation method according to claim 8,
wherein the evaluation value represents an objective evaluation value relating to the quality of the conversation, and
the evaluation method further comprising:
converting the objective evaluation value to a subjective evaluation value.

13. The evaluation method according to claim 12,
wherein the converting further comprises linearly converting the objective evaluation value to obtain the subjective evaluation value based on a linear relationship obtained from a subjective evaluation value acquired in a conversational test performed across two acoustic areas of the plurality of acoustic areas and an objective evaluation value acquired using an evaluation target sound and a reference sound obtained by recording a voice of the conversational test.

14. The evaluation method according to claim 12,
wherein the converting further comprises obtaining, as the subjective evaluation value, $y=ax+b$, where x is the objective evaluation value, a is 1.3 or close to 1.3, and b is $-0.45$ or close to $-0.45$.

15. A non-transitory computer-readable recording medium storing computer-executable evaluation program instructions for performing the evaluation method according to claim 8.

* * * * *

UNITED STATES PATENT AND TRADEMARK OFFICE
CERTIFICATE OF CORRECTION

PATENT NO. : 12,267,453 B2
APPLICATION NO. : 17/613908
DATED : April 1, 2025
INVENTOR(S) : Kurihara et al.

Page 1 of 1

It is certified that error appears in the above-identified patent and that said Letters Patent is hereby corrected as shown below:

On the Title Page

Item (30) Foreign Application Priority Data, the data reading:
- Aug. 16, 2019 -
Should read:
-- May 30, 2019 --

Signed and Sealed this
First Day of July, 2025

Coke Morgan Stewart
*Acting Director of the United States Patent and Trademark Office*